United States Patent
Karvounis et al.

(10) Patent No.: US 9,823,068 B2
(45) Date of Patent: Nov. 21, 2017

(54) REDUCING ELEVATION ERROR WITH ENVIRONMENTAL PRESSURE ANOMALY COMPENSATION

(71) Applicant: TRX Systems, Inc., Greenbelt, MD (US)

(72) Inventors: John Karvounis, Bowie, MD (US); Jared Napora, Severn, MD (US); Dan Hakim, Silver Spring, MD (US); Carole Teolis, Glenn Dale, MD (US); John Riley Miller, Hanover, MD (US); Benjamin E. Funk, Ellicott City, MD (US)

(73) Assignee: TRX Systems, Inc., Greenbelt, MD (US)

( * ) Notice: Subject to any disclaimer, the term of this patent is extended or adjusted under 35 U.S.C. 154(b) by 0 days.

(21) Appl. No.: 15/040,996

(22) Filed: Feb. 10, 2016

(65) Prior Publication Data

US 2016/0169670 A1    Jun. 16, 2016

Related U.S. Application Data

(63) Continuation of application No. 14/714,209, filed on May 15, 2015, now Pat. No. 9,322,648, and a (Continued)

(51) Int. Cl.
*G01C 5/06* (2006.01)
(52) U.S. Cl.
CPC ..................... *G01C 5/06* (2013.01)

(58) Field of Classification Search
CPC ............ G01C 5/06; G01C 21/00; G01L 25/00
See application file for complete search history.

(56) References Cited

U.S. PATENT DOCUMENTS

| | | | |
|---|---|---|---|
| 4,457,179 | A | 7/1984 | Antonazzi et al. |
| 6,125,710 | A | 10/2000 | Sharp |
| | | (Continued) | |

FOREIGN PATENT DOCUMENTS

JP    2011-257260 A    12/2011

OTHER PUBLICATIONS

International Patent Application No. PCT/US2013/45446; Int'l Preliminary Report on Patentability; dated Jan. 29, 2015; 29 pages.
(Continued)

*Primary Examiner* — Bryan Bui
(74) *Attorney, Agent, or Firm* — Baker & Hostetler LLP

(57) ABSTRACT

A method for determining an environmental pressure change affecting a pressure sensor within a portable device to determine an elevation of the portable device is disclosed. The method involves estimating a location of the mobile device, estimating an atmospheric pressure associated with the mobile device at a server based on data indicative of atmospheric pressure received from the mobile device, and generating the elevation of the mobile device based on the atmospheric pressure associated with the mobile device and reference data indicative of an absolute elevation reference. The absolute elevation determined may be based on the estimated location of the mobile device and elevation data obtained from a reference map.

19 Claims, 7 Drawing Sheets

Related U.S. Application Data continuation-in-part of application No. 13/916,024, filed on Jun. 12, 2013, now Pat. No. 9,671,224.

(60) Provisional application No. 62/100,456, filed on Jan. 6, 2015, provisional application No. 61/783,799, filed on Mar. 14, 2013, provisional application No. 61/658,883, filed on Jun. 12, 2012.

(56) References Cited

U.S. PATENT DOCUMENTS

| | | |
|---|---|---|
| 7,751,949 B2 | 7/2010 | Alanen et al. |
| 8,706,414 B2 | 4/2014 | Funk et al. |
| 8,874,398 B2 | 10/2014 | Raghupathy et al. |
| 9,146,113 B1 | 9/2015 | Funk et al. |
| 9,664,521 B2 | 5/2017 | Funk et al. |
| 9,733,091 B2 | 8/2017 | Kordari et al. |
| 2008/0077326 A1 | 3/2008 | Funk et al. |
| 2010/0250134 A1 | 9/2010 | Bornstein et al. |
| 2011/0153208 A1 | 6/2011 | Kruglick |
| 2012/0072110 A1 | 3/2012 | Venkatraman et al. |
| 2012/0290253 A1 | 11/2012 | Barrett et al. |
| 2013/0332106 A1 | 12/2013 | Karvounis et al. |
| 2014/0135040 A1* | 5/2014 | Edge .................. H04W 4/028 455/456.6 |

OTHER PUBLICATIONS

U.S. Appl. No. 61/783,799, filed Mar. 14, 2013, Karvounis et al.
English Translation of JP 2011-257260 published Dec. 22, 2011; Seiko Epson Corp.; 71 pages.

* cited by examiner

REDUCING ELEVATION ERROR WITH ENVIRONMENTAL PRESSURE ANOMALY COMPENSATION

CROSS REFERENCE TO RELATED APPLICATIONS

This application is a continuation of U.S. patent application Ser. No. 14/714,209, filed May 15, 2015, which claims benefit under 35 U.S.C. §119(e) of U.S. Provisional Application No. 62/100,456 filed Jan. 6, 2015, and is a continuation-in-part application of U.S. application Ser. No. 13/916,024, filed Jun. 12, 2013, which claims benefit under 35 U.S.C. §119(e) of Provisional U.S. Patent Application No. 61/783,799, filed Mar. 14, 2013, and U.S. Provisional Application No. 61/658,883, filed Jun. 12, 2012, all of which are incorporated herein by reference in their entireties.

GOVERNMENT RIGHTS

This invention was made with government support under contract number W91 CRB-09-00089, awarded by the U.S. Army, W31 P4Q-10-C-0166, awarded by the Defense Advanced Research Projects Agency, and W31 P4Q-12-C-0043, awarded by the Defense Advanced Research Projects Agency. The Government has certain rights in the invention.

TECHNICAL FIELD

This disclosure relates generally, but not exclusively, to the generation of global differential pressure references.

BACKGROUND INFORMATION

Environmental pressure variations may affect the ability of the system to resolve elevation if not compensated.

SUMMARY

Disclosed herein are methods, systems, and computer readable storage media that provide for reducing elevation error in tracking systems using environmental pressure anomaly compensation. The disclosed techniques reduce elevation resolution error by accounting for various sources of environmental pressure variations that negatively impact elevation resolution error including: local environmental fluctuations, wide area environmental fluctuations (e.g. weather related environmental pressure variations), or a combination thereof. In some embodiments, the disclosed techniques utilize terrain elevation data to provide an absolute elevation reference. These and other features will be more clearly understood from the following detailed description taken in conjunction with the accompanying drawings and claims.

DETAILED DESCRIPTION OF EMBODIMENTS

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The present disclosure describes a method for reducing elevation error in tracking systems using environmental pressure anomaly compensation. In some embodiments, inertial elevation monitoring may be used to identify and mitigate the effects of local environmental pressure fluctuations. In some embodiments, terrain elevation data may be used to provide an absolute elevation reference. In some embodiments, pressure reference data is crowd sourced from opportunistic devices. In commonly owned U.S. patent application Ser. No. 13/916,024, filed Jun. 12, 2013, entitled "Methods for Resolving the Elevation of Tracked Personnel or Assets," which is incorporated herein by reference, a method is described for using multiple static references to piece together a local reference pressure that can be used to compensate for environmental variations in pressure. The present disclosure expands on that work to compute a global differential pressure reference based on crowd sourcing data from still pressure measurement devices. Examples of opportunistic still pressure measurement devices include a user's smartphone containing a pressure sensor that is at rest, for example, on their desk or in a coffee shop, a placed sensor, a sensor in a vehicle that is parked or at a light, or any other available infrastructure sensors.

Pressure Anomaly Detection and Filtering

Figure 1:
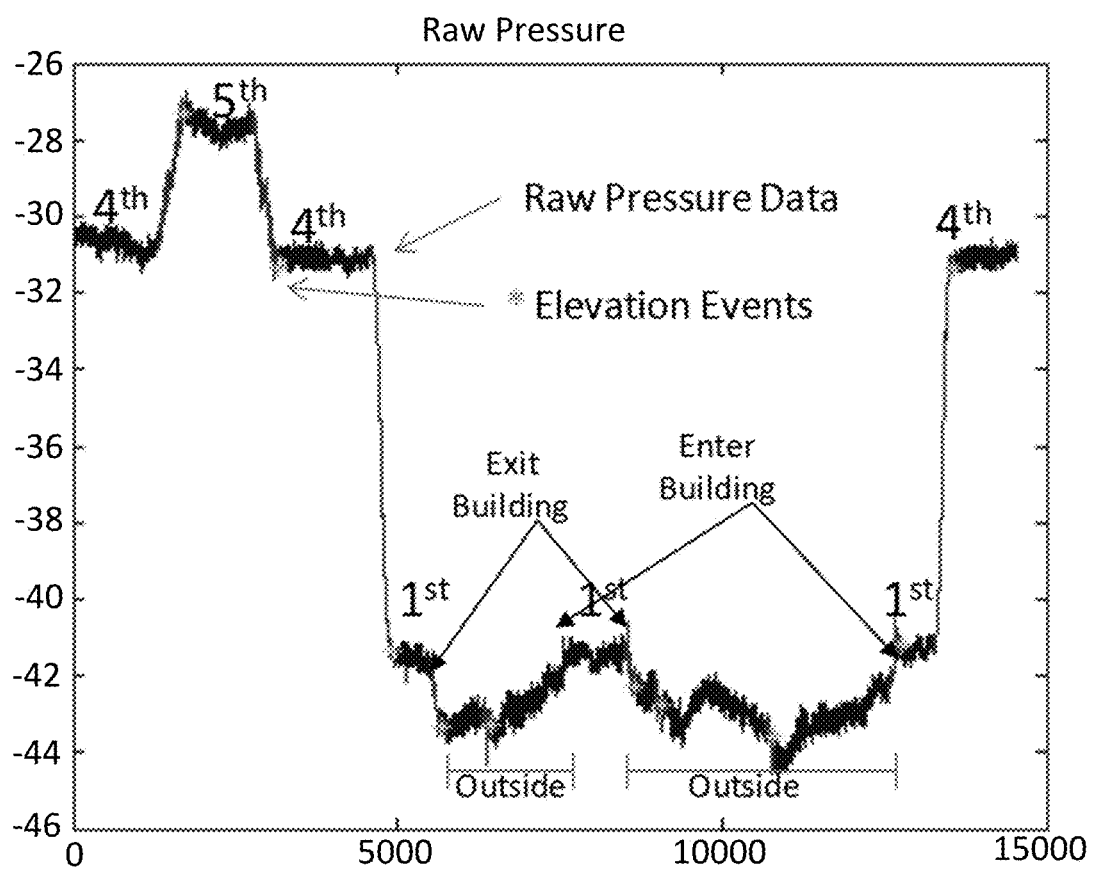
FIG. 1 is a graph illustrating unfiltered pressure data in accordance with an embodiment.

Spikes in pressure data ("pressure spikes") associated with local environmental pressure fluctuations are one source of environmental pressure variation that contribute to elevation resolution error. For example, the normal operation of a building's heating, elevation, and air conditioning ("HVAC") system may contribute to a sudden shift (i.e. increase or decrease) in environmental pressure within the building. As another example, pressure data associated with a tracked device upon entering a building on a windy day may also reflect pressure spikes. Unfiltered pressure data associated with a tracked mobile device ("tracked device") within the building may reflect pressure spikes corresponding to the HVAC system's normal operation. FIG. 1 depicts such unfiltered pressure data that was obtained during an exemplary test using a NEON® tracking unit developed by TRX Systems, assignee of the present disclosure. As described in U.S. patent application Ser. No. 13/916,024, the NEON® tracking unit is a navigation system that produces location coordinates, heading information, confidence estimates, and constraint data that may be used by a navigation engine of the navigation system to further improve the accuracy of the calculation of a path being taken by a person or object being tracked. Accordingly, determining elevation using unfiltered pressure data associated with the tracked device upon entering the building may introduce some elevation resolution error (e.g. one or two floors) due to the pressure spike. However, elevation resolution error introduced by this source of environmental pressure variation may be accounted for using data provided by inertial sensors ("inertial sensor data") associated with the tracked device. Such inertial sensor data may enable a determination as to whether the environmental pressure variation corresponds to a local environmental pressure fluctuation or caused by an actual change in elevation of the tracked device.

In some embodiments, "elevation events" may be detected, in part, by a change in environmental pressure. In these embodiments, elevation events may comprise a start time when a pressure data window transitions from stable to unstable. In these embodiments, elevation events may comprise an end time when a pressure data window transitions from unstable to stable. A pressure data window may be determined stable if an elevation indication within the pressure data window varies less than a threshold value (e.g. 1 m) within a specified time period (e.g. 5, 10, or 12 seconds). A pressure data window may be determined unstable if an elevation indication within the pressure data window varies more than a threshold value (e.g. 1 m) within a specified time period (e.g. 5, 10, or 12 seconds). In an embodiment, inertial sensor data may include z-axis acceleration data that measures vertical acceleration. In some embodiments, the z-axis acceleration data may be filtered to remove the effects of gravity prior to integration with pressure data between elevation event start times and end times. The z-axis acceleration data may also be filtered prior to being reported to a navigation engine at an elevation event end time. In embodiments where filtered, a low pass filter may be used to filter the z-axis acceleration data. A filter cutoff frequency and a filter window length may be chosen to attenuate tracking device motion data while keeping a delay introduced by the filtering as short as practical for a real time system. For example, the low pass filter may be a Blackman window function comprising a filter window length of 127 on 40 Hz sampled data. In an example, a filter cutoff frequency of about 0.2 Hz may be chosen.

Inertial integration methods may be sensitive to device calibration. As such, any small offset may cause an integral to grow unbounded. Continually resetting a vertical acceleration offset ("zero velocity updating") when a tracked device remains still for a sufficient amount of time may help. However, zero velocity updating may not be sufficient if there is continual activity. In some embodiments, vertical zero velocity updates may be performed each time a pressure sensor indicates elevation has remained unchanged for a specified time period (e.g. 5 seconds). Therefore, using the disclosed method, a tracked device may not need to be below an activity threshold for calibration. The disclosed method may thus only require that pressure remain stable for a short period of time which may occur more frequently than elevation remaining unchanged for a specified time period.

In an embodiment, a minimal acceleration value may be substituted for z-axis acceleration data that does not meet a minimal acceleration threshold value (upon removing the effects of gravity) prior to integration in order to avoid small bias effects. For example, a minimal acceleration value of zero may be substituted for z-axis acceleration data that does not meet a minimal acceleration threshold value. A narrow "dead zone" of vertical acceleration may be effectively created a narrow "dead zone" when the minimal acceleration value is substituted for the z-axis acceleration data. In this narrow "dead zone", all values with an absolute value of less than a threshold (e.g. 15 mg) may be ignored.

In an embodiment, an availability of high sample rate data (e.g. in a sensor hub) may be needed to implement some aspects of the disclosed inertial integration techniques. In an embodiment, elevation events that a pressure event timing and the inertial elevation change during the same window may be forwarded to an application processor. When entering a pressurized building, it is expected that an event generation with a delay (approximately 2.5 seconds) will be seen that indicates there was no elevation change. In an embodiment, a navigation engine may be able to handle out of order or delayed constraints that occur within a short time period (e.g. 60 seconds).

The unfiltered pressure data depicted in FIGS. 1-2 was derived from pressure sensors of a tracked device as a user wearing the device followed a path as described below:

1. The user began walking from a start point within an office on the 4th floor in an office building.
2. The user then proceeded up a southeast stairwell to a 5$^{th}$ floor of the office building.
3. The user then walked across the 5$^{th}$ floor of the office building and proceeded down a northwest stairwell back to the 4$^{th}$ floor of the office building.
4. The user then took an elevator from the 4$^{th}$ floor to the 1$^{st}$ floor and walked out a front door of the office building.
5. The user then walked around outside to a side door and reentered the office building.
6. The user then walked to a back door and exited the office building.
7. The user then walked around outside for a period of time before proceeding to a side door and reentered the office building.
8. The user then took an elevator back to the 4th floor and returned to the start point, which became the end point as well.

Figure 2:
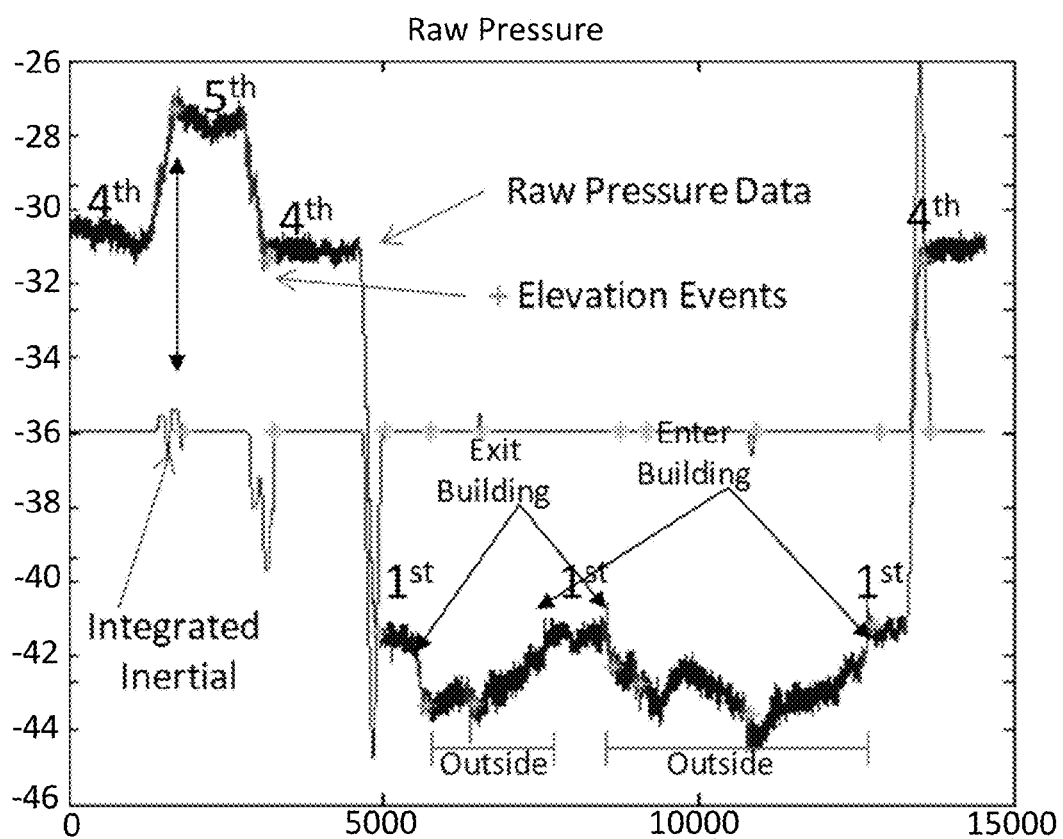
FIG. 2 is a graph illustrating inertial data obtained concurrently with and overlaying the unfiltered pressure data of FIG. 1, in accordance with an embodiment

FIG. 2 depicts unfiltered pressure data from the exemplary test described above (and as depicted in FIG. 1) overlaid with inertial data obtained from the tracked device during the same exemplary test. Elevation events in FIG. 2 are designated with asterisks "*" on both the unfiltered pressure data and the overlaid inertial data. As shown by FIG. 2, "true" elevation changes may be associated with large inertial elevation variation indications. In contrast, local environmental pressure fluctuations (e.g. fluctuations in pressure when entering a building produce) may be associated with little-to-no inertial elevation variation indication.

Crowd-Sourced Distributed Pressure Reference

Figure 3A:
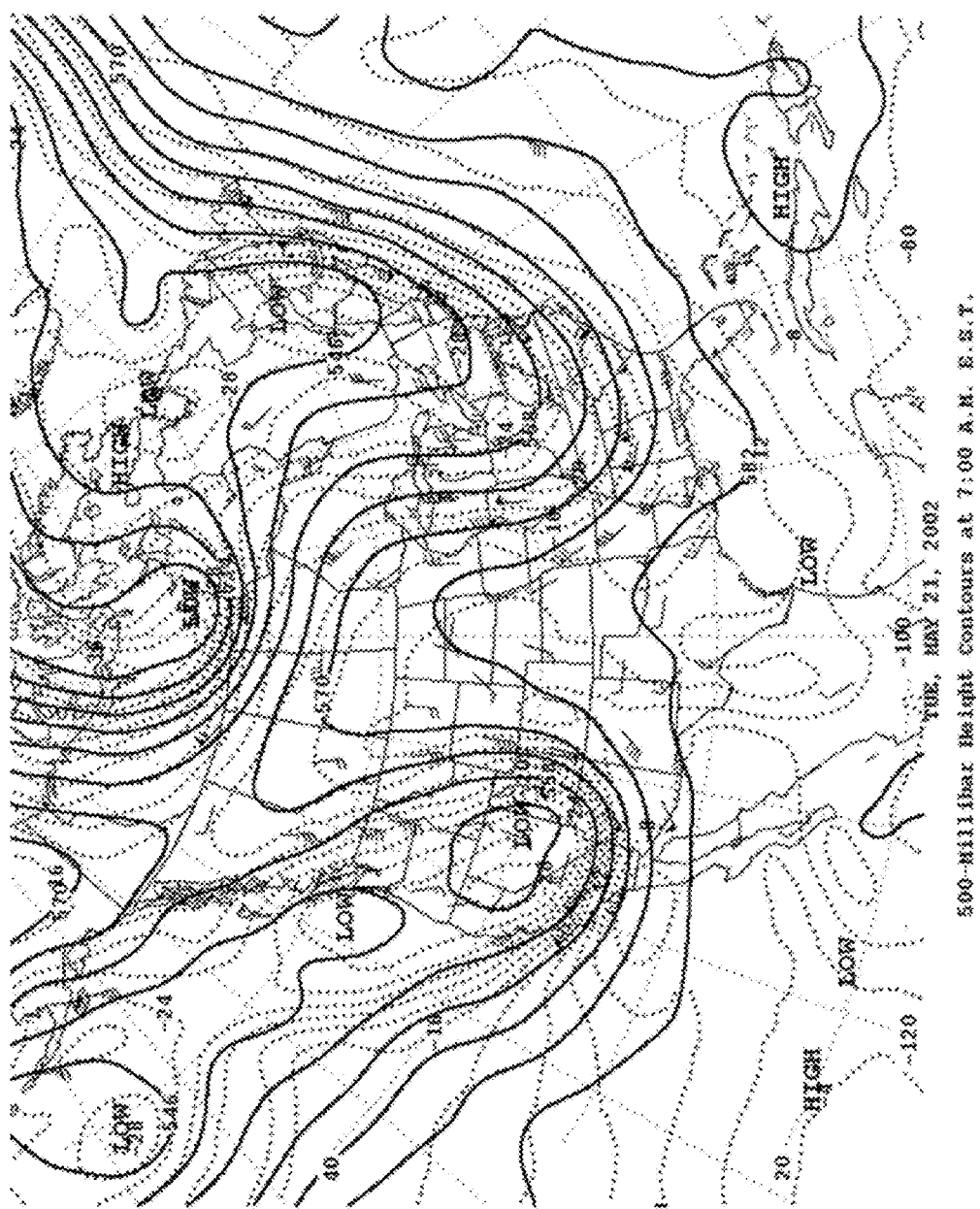
FIGS. 3A and 3B are pictorial diagrams of pressure contour maps over the United States at different points in time.
Figure 3B:
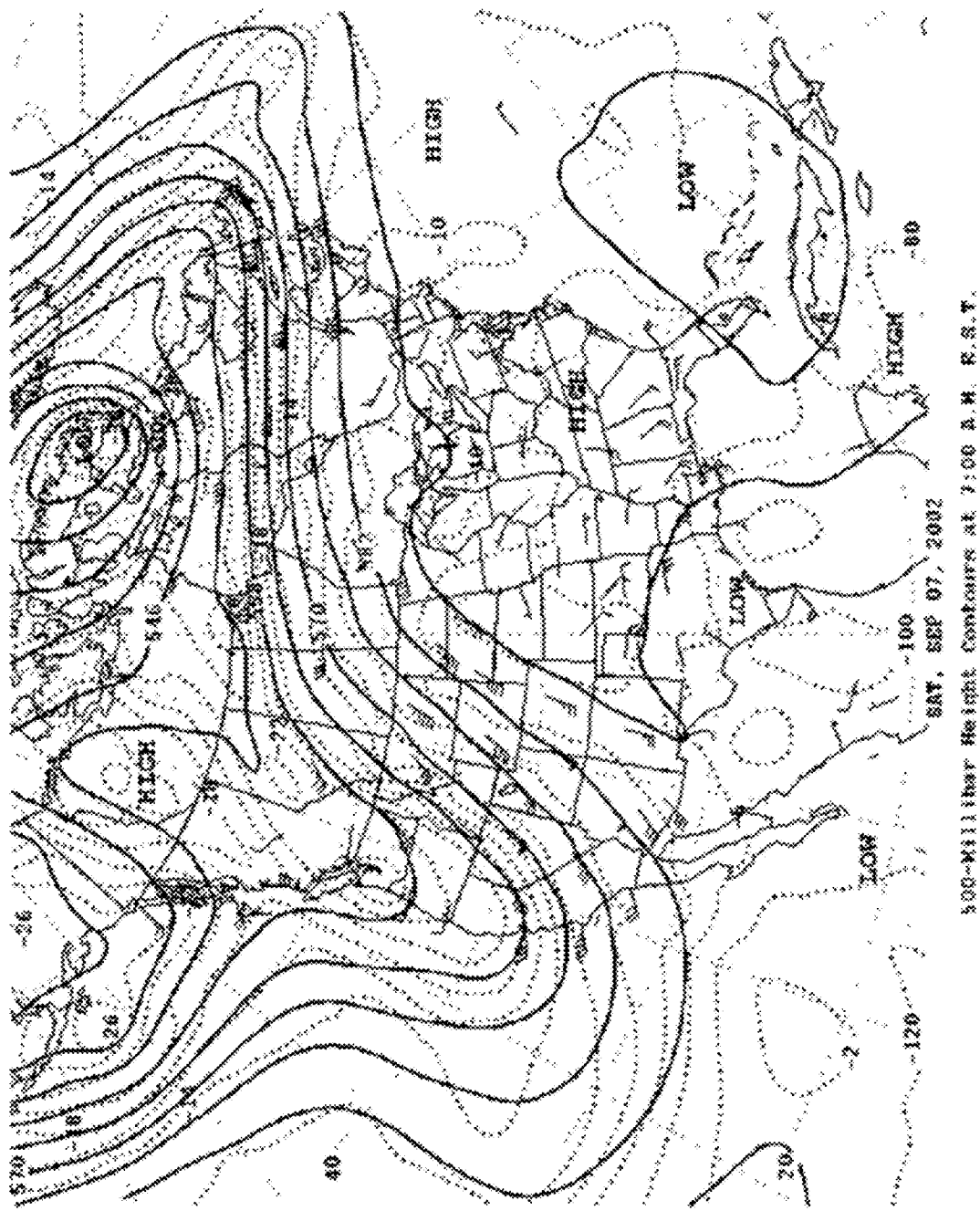

It is well known that barometric pressure decreases as elevation increases. For example, barometric pressure has been used in aircraft to determine elevation for decades. In 2011, some commercial manufacturers began putting pressure sensors into commercial smartphone platforms. One reason for doing so was to enable elevation in buildings to be determined from the smartphone sensors in order to support services such as E-911. However, when using barometric pressure sensors as an input for computing elevation, it may be necessary to remove local atmospheric pressure variations from such inputs. Such local atmospheric pressure variations may present both inside and outside of buildings. Local atmospheric pressure variations may also change as a function of location based on weather patterns, as well as elevation. FIGS. 3A-3B show pressure contour maps over the United States, with FIG. 3A being based on pressure contours as of May 21, 2002, and with FIG. 3B based on very different pressure contours as of Sep. 7, 2002. FIGS. 3A-3B illustrate that as different storms come in, pressure can also change in different locations due to the weather, and, if not compensated for it, such pressure changes may also cause elevation errors that may result in elevation changes or location readings being off by several floors within a building.

Another issue with low-cost pressure sensors is that each device may have a significant offset relative to pressure sensors associated with other devices. While some pressure sensors (e.g. barometric pressure sensors) may have a precise resolution, they may suffer from a poor absolute accuracy. Such poor absolute accuracy may result in significant sensor-to-sensor variation. In practice, this sensor-to-sensor offset may also introduce an elevation error of multiple floors between two tracked devices, if such sensor-to-sensor offsets are not properly compensated. Sample resolution and accuracy information from a low-cost pressure sensor datasheet is listed below in Table 1.

TABLE 1

Barometric Pressure Sensor Datasheet Information

| Parameter | Value (mbar) | Value (Pa) | Distance (m at 1 atm) |
| --- | --- | --- | --- |
| Resolution | 0.012 | 1.2 | 0.099 |
| Accuracy | ±1.5 | ±150 | ±12.5 |

Accordingly, enabling pressure sensor data to be useful in determining consistent elevation across platforms may require compensating for either sensor-to-sensor offsets or local atmospheric (e.g. weather-related) pressure variations that are not resulting from elevation changes. In systems designed to primarily work in a small geographic area, it may be common to place a static pressure reference that may be used both to compensate for sensor-to-sensor offset and local atmospheric pressure variations (e.g. environmental pressure variations). In systems primarily designed to work anywhere in the world, geographically distributed pressure references may be needed. Such references may be installed as part of an infrastructure, such as on cell phone towers around the world or even in individual buildings. However, installing such references as part of an infrastructure may expensive and may be available only in certain areas. Accordingly, a method for crowd sourcing pressure reference data from opportunistic devices is described herein.

Prior filed patent U.S. patent application Ser. No. 13/916, 024 describes a method for using multiple static references to piece together a local reference pressure that can be used to compensate for environmental variations in pressure. An aspect of the method described herein expands that work to determine a global differential pressure reference based on crowd sourced data from still pressure measurement devices. Examples of opportunistic still pressure measurement devices may include a user's smart phone containing a pressure sensor that is stationary (e.g. at the user's desk or in a coffee shop); a placed sensor; a sensor in a vehicle that is parked or at a light; or any available infrastructure sensors.

In an embodiment, a pressure data maps may be broken into tiles for access given a device's 2-D location estimate (e.g., using the Web Mercator Tiling Scheme—a technique that many web map databases use). Then, a device in any location may obtain an estimate of atmospheric pressure variation using crowd sourced reference data. In an embodiment, an estimate of atmospheric pressure variation may enable a device to minimize the effect of environmental variations in pressure on the device's elevation.

In an embodiment, differential pressure, which may be primarily affected by a particular sensor's relative accuracy, is used to minimize the need to compute a sensor-to-sensor offset for each device contributing to a reference database or know an elevation of different sensors (e.g. based on terrain or a building floor a particular sensor is located). In an embodiment, averaging data from different devices, spatially interpolating over areas with missing pressure reference data, or a combination thereof may be effective in generating a global differential pressure reference.

An exemplary method that may be followed in accordance with an embodiment is as follows:

1—Sample pressure data from at least one stationary pressure sensor. There are a number of known methods that may be used to determine that the sensor is stationary (e.g. monitoring accelerometer readings).

2—Interpolate pressure data to a regular sample time interval, such as 1 Hz. In an embodiment, devices may be occasionally time synced at least occasionally so that all devices can report on the same interval. For example, devices may be time synced to UTC. In an embodiment, a required time sync interval may depend on a device's clock drift rate.

3—Determine a difference of an interpolated pressure signal over each interval. In an embodiment, the determined difference may be used as a discrete differential signal. In an embodiment, a differential pressure signal may not be affected by a contributing sensor's offset or elevation.

4—Determine a location of a stationary pressure sensor. In an embodiment, a location may be a known location (e.g. an installed sensor). In an embodiment, an estimated location of a movable device (e.g. a cell phone) may be determined using GPS, Wi-Fi data, Cell triangulation, or a combination thereof. In an embodiment, differential altitude data may be added to a global pressure map based on a movable device's estimated location.

5—Data may be added to a pressure map tile that contains the stationary reference location. In an embodiment, since weather-related pressure variations cover wide areas, a single stationary reference may provide pressure reference data for a relatively larger area. In this embodiment, a pressure grid tile size may not have to be small. For example, a pressing grid tile sizing based on the Web Mercator Tiling Scheme level 16 which is approximately 373941 m$^2$ at the equator may be used.

6—On one or more pressure map tiles, received differential pressure signals covering a particular time interval may be averaged. In an embodiment, if data is not available for a particular time interval, a pressure difference may be set to a minimal value indicating a minimal (e.g. no change) in environmental pressure over that interval (e.g. 0). One result may be a crowd-sourced discrete differential pressure estimate over time for the one or more pressure map tiles.

7—To compute the environmental pressure change over any time interval at a location, a differential pressure for surrounding tiles may be cumulatively summed over a particular time interval. In an embodiment, pressure change data may then be interpolated between pressure map tiles to provide a smooth estimate of a pressure variation in a corresponding area.

8—In an embodiment, an environmental pressure change may be subtracted from a device's measured pressure before determining an elevation. One or more devices may also compensate for its own sensor-to-sensor (e.g. device) offset. However, in an embodiment, sensor-to-sensor offset may be fairly consistent over short periods of time. In this embodiment, sensor-to-sensor offset may be determined on a device when the device is at a known location. In this embodiment, a device may only be periodically checked and updated.

In an embodiment, if data for any pressure map tile does not exist over an interval, that data may be computed based on surrounding pressure map tiles by interpolation. In an embodiment, if both a pressure map tile and the surrounding pressure map tiles do not have data, an estimate could be determined. For example, an estimate may be made that there was no change—that is, the differential pressure is 0. As another example, an estimate may determine that the differential pressure is equal to an average of the nearest surrounding pressure map tiles with data when such pressure map tiles are within a specified threshold distance.

With pressure fluctuations removed, low-cost pressure sensors are generally good at providing relative elevation information for a single tracked device.

Terrain Server—Absolute Elevation Reference

In an embodiment, each device may compensate for its own device pressure (e.g. sensor-to-sensor) offset. If such sensor-to-sensor offsets are not properly resolved, an elevation error of multiple floors between two tracked devices may result. As discussed above, sensor-to-sensor offset may be fairly consistent over short periods of time. As such, in an embodiment, a device offset may be determined on a device when the device is at a known location and elevation, and then only periodically checked and updated.

Resolving the sensor-to-sensor offset using well known equations that relate altitude to pressure may be easier if a system has access to an absolute elevation reference. However, obtaining an absolute elevation reference may be difficult. In an embodiment, GPS or a visual check-in on a map may be used for an absolute horizontal position. For elevation, GPS may not always provide good constraint; in fact, GPS elevation may generally be quite poor, especially near buildings. Additionally, most map servers may not provide terrain elevation data. In an embodiment, knowledge of terrain elevation may be important for providing an absolute elevation reference (e.g. to enable the computation and removal of sensor-to-sensor offsets), as well as for estimating transitions into a building or underground structure.

In an embodiment, a terrain elevation server able to provide elevation data along with the base map tiles for a system may enable the system to work more seamlessly over larger areas. In an embodiment, terrain elevation data for the United States may be obtained from United States Geological Survey ("USGS") at varying resolutions. In some embodiments, lower resolution terrain data may be used to fill in holes in higher resolution terrain data.

Figure 4:
FIG. 4 is an illustration of an exemplary user interface visualizing terrain and building data according to an embodiment of the present disclosure.

In an embodiment, device offsets may not be used directly by an elevation engine. In an embodiment, constraints increasing the probability that a computed location is on the terrain may applied when a determination is made that a device is outdoors or when a system has no building information. In an embodiment, a constraint may not force a solution to the terrain. For example, a location may move underground into a tunnel or up into a building without any a priori knowledge of those structures. FIG. 4 illustrates an exemplary user interface visualizing terrain and building data according to an embodiment of the present disclosure.

Elevation Particle Filter

In an embodiment, an elevation engine may be implemented as a particle filter.

Elevation indoors has interesting properties because people and other objects may be generally limited to travel only on discrete levels defined by the building's floors.

In an embodiment, elevation (z) may be solved for independently of the horizontal location (x, y). However, some estimate of (x, y) location and whether the sensor is indoors or outdoors may be needed to understand whether to impose building/floor constraints. In an embodiment, an elevation solution may be driven by inputs from pressure or inertial sensors combined with constraints from various sources, including: known building models, inferred building models, ranging, user corrections, or a combination thereof. In an embodiment, environmental pressure data may be combined with device pressure to improve elevation estimate differences over time.

To solve for elevation, the methods described in prior filed patent U.S. patent application Ser. No. 13/916,024 may be adapted for application in a 1-dimensional particle filter. In an embodiment, a distribution of particles may represent a probability distribution of a device's location. In this embodiment, an estimate of a device's z location may be obtained by taking a weighted average over all the particles from this distribution of particles. Error metrics may also be described, including: a standard deviation, a CEP (i.e. the smallest circle which contains 50% of the particle weight), or a combination thereof. Techniques disclosed by U.S. patent application Ser. No. 13/916,024 may be used to create a particle filter to handle out-of-order data in order to handle a wide variety of constraints, varying frequency, time-lagged detection of constraints and environmental pressure, and the like.

Figure 5:
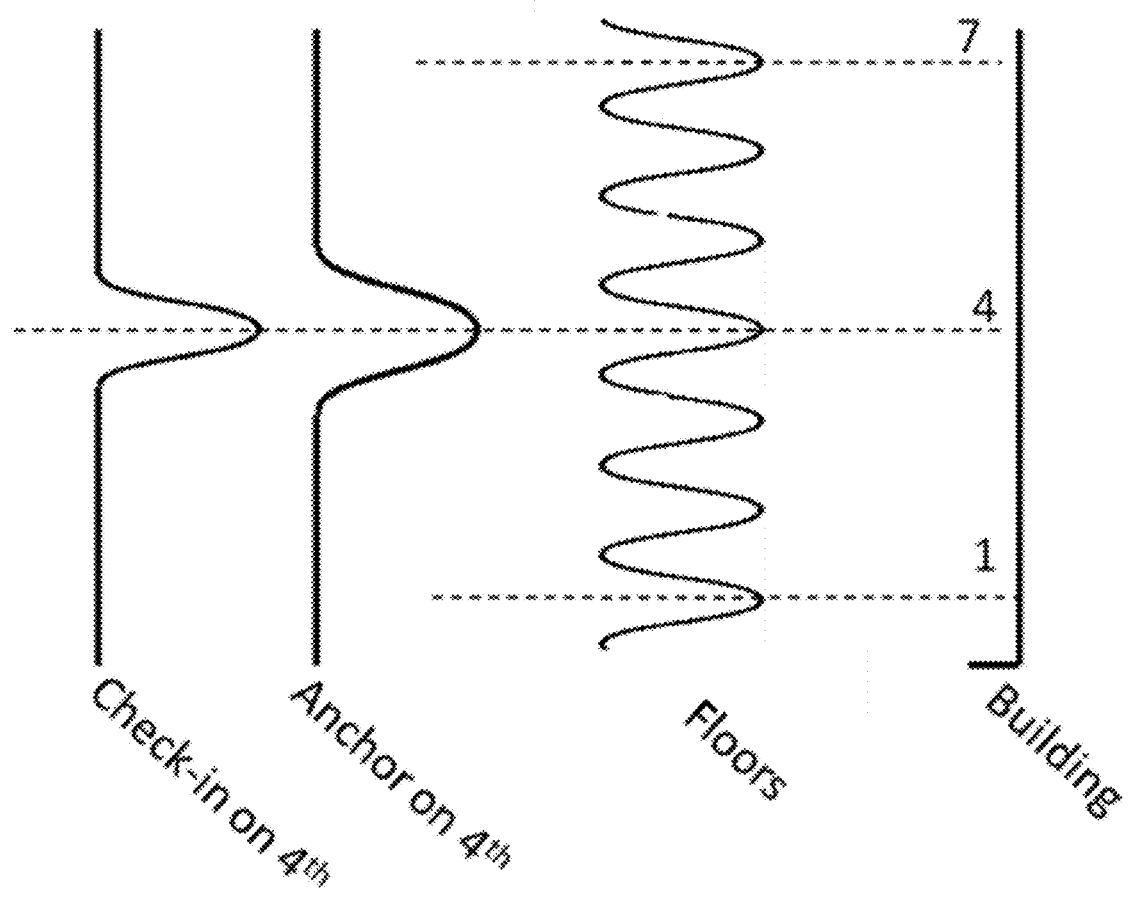
FIG. 5 is an illustration of different particle distributions generated with a particle filter that pin point a user's location on one or many floors of a building.

By computing elevation using a particle filter, the types of elevation constraints may be increased. A particle filter may enable constraints, such as check-ins that may: pin devices to a specific floor, pin devices to multimodal distributions, represent a device's location on one of many floors, or a combination thereof. Exemplary constraints are depicted in FIG. 5. Upon detecting a device entering a building with a known building model, a floor distribution constraint may be applied to the device's vertical particle distribution. In an embodiment, applying a floor distribution constraint to a device's vertical particle distribution may increase a weight of particles that are located on any known floor within a known building model. In an embodiment, applying a floor distribution constraint to a device's vertical particle distribution may allow a device to enter on any floor, with the most probable floor location determined by the device's elevation estimate prior to entering the building. Knowing the entrance locations in the building can further refine the elevation estimate to a lower number of possible floors. A match to a particular exit may refine floor to a single number and refine the (x, y) location as well.

Techniques disclosed herein or from patent U.S. patent application Ser. No. 13/916,024 may be used to determine when a device is moving on a level surface. In an embodiment, if a device is determined to be moving on a level surface in a building, a constraint may be created to put the device on one or multiple possible floors. This type of constraint may stop a device's elevation from drifting up and down due to small fluctuations in pressure in an associated environment. Because determination of the constraint may have a delay, once the constraint is received, a particle filter may be rewound to accept the constraint.

When moving outdoors, constraints may be created to give a higher probability to a device being near (e.g. within a meter or so) the terrain.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 6:
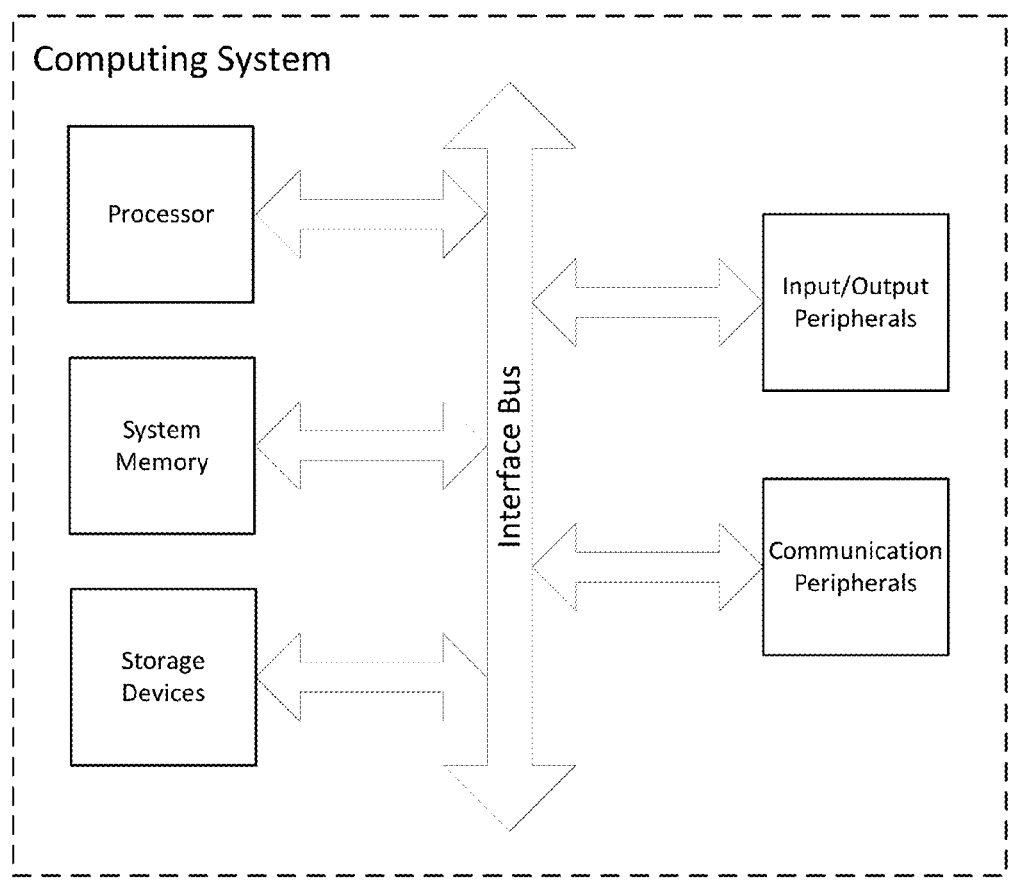
FIG. 6 is an illustration of an exemplary block diagram representing a general purpose computer system in which aspects of the methods and systems disclosed herein or portions thereof may be incorporated.

The techniques described above can be implemented on a computing device associated with a user (e.g., gyroscope and accelerometer sensors implemented on a device worn or carried by the user), a plurality of computing devices associated with a plurality of users, a server in communication with the computing device(s) (e.g., a server configured to calibrate the gyroscope and accelerometer sensors of the device worn or carried by the user), or a plurality of servers in communication with the computing device(s). Additionally, the techniques may be distributed between the computing device(s) and the server(s). For example, the computing device may collect and transmit raw data to the server that, in turn, process the raw data to improve heading estimation. FIG. 6 illustrates an exemplary block diagram of a computing system that includes hardware modules, software module, and a combination thereof and that can be implemented as the computing device and/or as the server.

In a basic configuration, the computing system may include at least a processor, a system memory, a storage device, input/output peripherals, communication peripherals, and an interface bus. Instructions stored in the memory may be executed by the processor to perform a variety of methods and operations, including the indoor/outdoor detector or indoor/outdoor manager and the navigation engine as described above. The computing system components may be present in the device worn or carried by the user, in a server or other component of a network, or distributed between some combination of such devices.

The interface bus is configured to communicate, transmit, and transfer data, controls, and commands between the various components of the electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may also include a variety of sensors, such as light, proximity, GPS, magnetic field, altitude, velocity/acceleration. RSSI, and distance sensors, as well as other types of sensors. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface and carry out other methods and operations that the user can use to provide input to the computing system and to receive an output from the computing system.

This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a WiFi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

As previously noted, the various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included in or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The terms and descriptions used above are set forth by way of illustration only and are not meant as limitations. Those skilled in the art will recognize that those and many other variations, enhancements and modifications of the concepts described herein are possible without departing from the underlying principles of the invention. The scope of the invention should therefore be determined only by the following claims and their equivalents.

What is claimed is:

1. A computer-implemented method for determining an elevation of a mobile device, comprising:
   estimating a location of the mobile device;
   estimating an atmospheric pressure associated with the mobile device at a server based on data indicative of atmospheric pressure as measured by a pressure sensor within the mobile device; and
   generating the elevation of the mobile device based on the atmospheric pressure associated with the mobile device and reference data indicative of an absolute elevation reference,
   the absolute elevation determined based on the estimated location of the mobile device and elevation data obtained from a reference map wherein the reference map is generated using terrain elevation data obtained from a plurality of datasets.

2. The method of claim 1, wherein each of the plurality of datasets have terrain elevation data at a different horizontal resolution.

3. The method of claim 2, wherein the terrain elevation data is obtained from a first dataset having terrain elevation at a first horizontal resolution and a second dataset having terrain elevation at a second horizontal resolution, the first horizontal resolution being a higher resolution than the second horizontal resolution, each of the first dataset and the second dataset being one of the plurality of datasets.

4. The method of claim 3, wherein terrain elevation data that is unobtainable from the first dataset is obtained from the second dataset to generate the reference map.

5. The method of claim 1, wherein the reference map includes reference data indicative of atmospheric pressure associated with a first map tile containing the estimated location of the mobile device, the first map tile being one of a plurality of contiguous map tiles composing the reference map.

6. The method of claim 5, wherein the reference data indicative of atmospheric pressure associated with the first map tile is subtracted from the data indicative of atmospheric pressure received from the mobile device prior to generating the elevation of the mobile device.

7. The method of claim 5, wherein the reference data is based, in part, on interpolated pressure data associated with a plurality of stationary pressure sensors located in an area outside of the first map tile that is associated with at least one of the plurality of contiguous map tiles.

8. A computer-implemented method for determining an elevation of a mobile device, the method being executed on a server and comprising:
   estimating a location of the mobile device;
   determining one or more elevation constraints related to the estimated location of the mobile device;
   estimating an atmospheric pressure associated with the mobile device based on data indicative of atmospheric pressure as measured by a pressure sensor within the mobile device; and generating the elevation of the mobile device using the one or more elevation constraints, and a particle filter to determine a distribution of particles based on the atmospheric pressure associated with the mobile device.

9. The computer-implemented method of claim 8, wherein the distribution of particles represents a probability distribution of the mobile device's elevation.

10. The computer-implemented method of claim 9, wherein generating the elevation includes calculating a weighted average over all particles composing the distribution of particles.

11. The computer-implemented method of claim 9, the method further comprising:
determining an error metric corresponding to the elevation of the mobile device based on the distribution of particles.

12. The computer-implemented method of claim 8, the method further comprising:
detecting the mobile device has entered a building with a known building model based in part on the estimated location; and
imposing at least one elevation constraint that assigns a higher weight to particles located on one or more floors of the known building model.

13. The computer-implemented method of claim 8, the method further comprising:
determining whether the mobile device is indoors or outdoors prior to generating the elevation.

14. The computer-implemented method of claim 13, wherein generating the elevation includes assigning a lower weight to particles located outside of a building when the portable device is determined to be indoors, and assigning a lower weight to particles located inside of a building when the portable device is determined to be outdoors.

15. The computer-implemented method of claim 13, wherein generating the elevation includes imposing at least one elevation constraint that increases a probability that the elevation of the mobile device is within a predefined distance of a terrain of the estimated location when the mobile device is determined to be outdoors.

16. A computing system for determining an elevation of a mobile device, the computing system comprising:
one or more processors; and
a memory communicatively coupled to the one or more processors, the memory bearing a first set of instructions that when executed on the one or more processors, cause the computing system to:
estimate a location of the mobile device;
determine one or more elevation constraints related to the estimated location of the mobile device;
estimate an atmospheric pressure associated with the mobile device based on data indicative of atmospheric pressure as measured by a pressure sensor within the mobile device; and
generate the elevation of the mobile device based on the atmospheric pressure associated with the mobile device, reference data indicative of an absolute elevation reference, and the one or more elevation constraints,
the absolute elevation reference determined based on the estimated location of the mobile device and elevation data obtained from a reference map, the reference map generated using terrain elevation data obtained from a plurality of datasets.

17. The computing system of claim 16, wherein the atmospheric pressure associated with the mobile device is further based on reference data indicative of atmospheric pressure associated with a first map tile of the reference map containing the estimated location of the mobile device.

18. The computing system of claim 16, wherein the data indicative of atmospheric pressure is filtered based on inertial data associated with the mobile device prior to estimating the atmospheric pressure associated with the mobile device.

19. The computing system of claim 18, wherein the data indicative of atmospheric pressure is further filtered based on correlations between the data indicative of atmospheric pressure and vertical accelerations associated with the mobile device exceeding an acceleration threshold.

* * * * *